United States Patent [19]
Ratté et al.

[11] 4,108,940
[45] Aug. 22, 1978

[54] COLD MOLDING OF FLEXIBLE ARTICLES

[75] Inventors: Jacques Ratté, Ste-Foy; Pierre Carignan, Charlesbourg, both of Canada

[73] Assignee: Her Majesty the Queen in right of Canada, as represented by the Minister of National Defence, Ottawa, Canada

[21] Appl. No.: 754,960

[22] Filed: Dec. 28, 1976

Related U.S. Application Data

[63] Continuation-in-part of Ser. No. 663,995, Mar. 4, 1976, abandoned.

[30] Foreign Application Priority Data

Feb. 6, 1976 [CA] Canada .................................. 245228

[51] Int. Cl.² ............................................... B29D 3/02
[52] U.S. Cl. .................................... 264/140; 264/152; 264/292; 264/320; 264/338

[58] Field of Search ....... 264/135, 136, 137, DIG. 59, 264/292, 294, 152, 118, 140, 320, 338

[56] References Cited

U.S. PATENT DOCUMENTS

| 1,205,345 | 11/1916 | Hatfield | 264/136 X |
|---|---|---|---|
| 2,400,533 | 5/1946 | Buffington | 264/137 |
| 3,235,530 | 2/1966 | Crouch | 260/37 |
| 3,532,784 | 10/1970 | Vasterling | 264/294 X |
| 3,872,205 | 3/1975 | Ratté et al. | 264/175 |

Primary Examiner—Jeffery R. Thurlow
Attorney, Agent, or Firm—Cushman, Darby & Cushman

[57] ABSTRACT

A novel process for the preparation of flexible molded articles, such as head-end insulators for rocket casings, which are exposed to extremely high temperatures. The articles are cold-molded from shreds, discs or strips consisting of asbestos fibers and floats impregnated with a substantially uncured elastomeric binder comprising a carboxyl-terminated polybutadiene polymer.

15 Claims, 6 Drawing Figures

U.S. Patent  Aug. 22, 1978  4,108,940
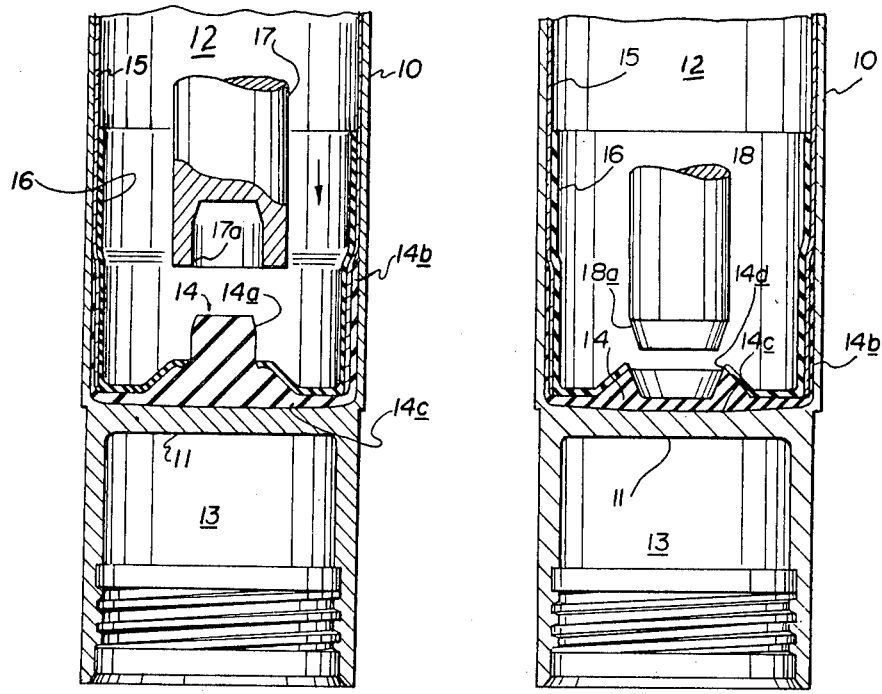
FIG. 1  FIG. 1a
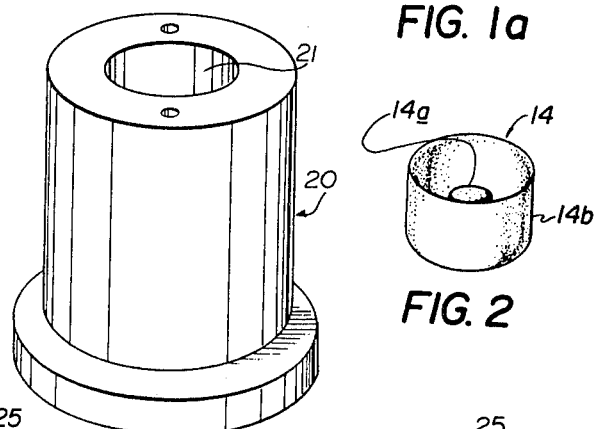
FIG. 2
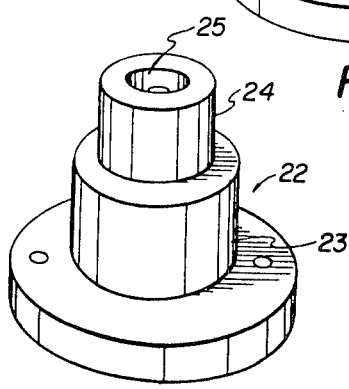
FIG. 3a
FIG. 3b
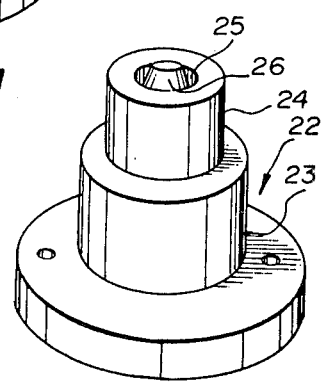
FIG. 3c

COLD MOLDING OF FLEXIBLE ARTICLES

This application is a continuation-in-part of application Ser. No. 663,995, filed Mar. 4, 1976 now abandoned.

This invention relates to a novel process for the preparation of flexible molded articles which are particularly useful in extremely high temperature environments, such as rocket motors.

The design of components used for the protection of metal surfaces against high temperature gases often confronts the engineer with a problem of material selection. For example, in the field of rocket motor insulation, the choice of material for the fabrication of one component know as the head-end insulator is very critical; the success or failure of a rocket motor firing often depends on the overall qualities of this vital component. The head-end insulator is located against the bulkhead of a rocket casing, and protects the bulkhead against the extremely high temperatures generated by combustion of the rocket fuel. Thus, this component must be capable of providing sufficient thermal insulation to protect a metallic surface (i.e. the bulkhead) against high temperature gases (over 3000° C), good ablative resistance whenever these gases are flowing, good mechanical properties over a wide temperature range ($-65°$ to $160°$ F) and especially good elasticity at low temperatures, ease of molding at reasonable cost, compatibility with other materials used in the insulation structure and ease of installation in the rocket chamber.

Therefore, as will be appreciated from the foregoing, the choice of materials suitable for use in this particular application is rather limited on account of the very stringent requirements. The most often used materials are based on phenolic resin-impregnated asbestos fibers. The material is easily molded to the desired shape and dimensions in steel molds at elevated temperature (340° F) and pressure (2000 p.s.i.).

Parts molded with phenolic resin-impregnated asbestos meet some of the requirements set forth above, such as being easily molded and providing sufficient thermal insulation. However, they are very rigid parts which are awkward to insert into metallic tubes such as rocket casings, especially when these tubes are slightly oval. Their rigidity also prevents close fitting of the part against the forward closed end of the tubes. Their very low elasticity over the whole temperature range (less than 1 percent) can be a source of problems, especially at low temperature. Also, the use of cement to bond such parts to metal surfaces is necessary, and the cure period of this cement adds an extra step in the rocket motor preparation. Furthermore, these parts are neither compatible with some elastomer-based sidewall insulants, such as roll-formed butadiene, — nor with the commonly used polymeric propellants.

Therefore, an object of this invention is to provide a process for forming molded articles which meet the performance requirements set forth above and which are based upon an elastomeric polymeric binder system including an insulating siliceous filler, such as asbestos.

In U.S. Pat. No. 3,872,205 (Ratté et al), there is described a novel insulation material for use as a rocket motor sidewall insulant, such material being in the form of a sheet comprising an elastomeric polymer binder and a fire-resistant siliceous reinforcing filler dispersed therein. A method of forming the sheet is also described, such method involving the steps of admixing the polymeric binder with the filler to form a dough and aging the dough to effect sufficient curing to permit rolling of the dough into a sheet. In a specific example given in this patent, the elastomeric polymer is a carboxyl-terminated polybutadiene, which is compatible with commonly-used polybutadiene rocket propellants. Thus, the material is eminently suitable for the environment of a rocket chamber, as has amply proven in use. However, certain components — such as the head-end insulator — require to be molded into specific shapes and the sheet material of Ratte et al is clearly unsuitable for these components. Hot molding of filled compositions to give cured products of high strength is known. For example, Crouch et al in U.S. Pat. No. 3,235,530 teach a method of forming high-strength articles by hot-molding an asbestos/resin binder composition. A high-bulk asbestos paper is impregnated with a thermosetting resin solution and then passed between squeeze rollers to control the amount of liquid saturating the material. The volatile components are then eliminated by heating the impregnated sheet, and the sheet is then precured. For the molding operation, the precured sheet is macerated into shreds, discs or strips, which are changed into a mold and subjected to heat and pressure. As mentioned above, the articles so produced have high-strength and rigidity, which is contrary to the requirements of the present invention that the molded articles have good flexibility. Two major problems exist with the Crouch process, the first of which is that the binder is a thermosetting resin rather than an elastomer and the second of which is that heat is used in the molding process, which inevitably cures the product to a highly rigid state.

Therefore, the present invention is based upon an elastomeric binder/asbestos filler system, wherein no heat is employed during the actual molding process. Thus, the end product possesses the attributes of flexibility and compatability with other elastomeric polymeric components and propellants as discussed above. In order to avoid curing the molding material, a cold-molding process is employed. We have found that such process works effectively with a charge material formed by shredding the insulant sheet product of the Ratte et al patent. It is important to note that — quite apart from the difference in the binders employed — such charge is quite different from that of the Crouch process, wherein a macerated sheet of asbestos paper impregnated with resin binder is used. In the present invention, the charge material is derived from shredding a sheet which has been formed from a partially cured dough of elastomeric polymeric binder having, dispersed therethrough, asbestos filler in an amount of from 50% to 80% by weight of the total composition, at least 50% of said filler being in the form of fibers and the remainder in the form of floats.

Thus, the invention may be summarized as follows. A sheet material comprising an uncured elastomeric polymeric binder and a siliceous filler is firstly formed according to the process of U.S. Pat. No. 3,872,205, the siliceous filler being in the form of fibers and floats dispersed through the binder. The sheet is then processed into strips, discs or shreds which are maintained at sufficiently low temperature to prevent or, at least, inhibit curing, and the strips, discs or shreds are then cold-molded in their substantially uncured condition to form the desired article.

The article formed from the aforesaid process retains the enhanced insulation properties of the molding composition, is flexible and will adhere to metal surfaces — with or without the use of adhesive — when used during its normal shelf-life. Where such article is for use in a rocket motor as a head-end insulator for example, it can be manoeuvered to fit closely the contour of the propellant chamber bulkhead when pressurized and it is easily insertable into the casing even when the latter is slightly oval in cross-section.

The invention will now be described further by way of example only and with reference to the accompanying drawings; wherein FIGS. 1 and 1a are cross-sectional views of a rocket casing, including head-end insulators according to two embodiments of the present invention;

FIG. 2 is a perspective view of the head-end insulator shown in FIG. 1, prior to its insertion in the rocket casing;

FIGS. 3a and 3b are perspective views of female and male halves of a mold for forming the head-end insulator of FIG. 2, and FIG. 3c shows a male mold half for forming a head-end insulator as shown in FIG. 1a.

Referring now to the drawings, and particularly to FIGS. 1 and 1a thereof, a metal rocket casing 10 is formed with a bulkhead 11 between the propellant chamber 12 and the forward compartment 13 of the rocket. A head-end insulator 14 is provided in the casing 10 and snugly abuts the bulkhead 11 and the adjacent regions of the inner casing wall. The head-end insulator may either be generally cup-shaped, with a central projection 14a extending into the propellant chamber 12 (see FIG. 1) or formed with a central depression 14d (see FIG. 1a). The annular wall 14b of the insulator adheres to the inner wall of the casing 10 and the base 14c of the insulator adheres to the bulkhead 11. The insulator 14 according to the embodiment shown in FIG. 1 may be seen in perspective view in FIG. 2.

A sidewall insulant material 15 is provided around the inner wall of the propellant chamber 12 and extends over the wall 14b of the head-end insulator 14. This material normally comprises a matrix of asbestos fibers and floats in a suitable binder medium and is applied in sheet form to the inner surfaces of the casing 10 and insulator 14 by means of an expansible rubber bag. Finally, a head-end restrictor 16 is provided over a portion of the material 15 and the exposed inner surface of the insulator 14 (excluding the central projection 14a or the central depression 14d). The restrictor 16 functions to limit the exposed propellant surface and is normally formed from a suitable elastomeric material which is compatible with the particular propellant being used in the rocket. Preferably, a release agent is located between the insulator 14 and the restrictor 16 to reduce the stress concentration at the head-end of the propellant grain during temperature cycling.

Referring now to the formation of the head-end insulator 14, the insulator is cold-molded from strips, discs or shreds derived from a preformed sheet material. This sheet material comprises an elastomeric polymer binder — for example, a carboxyl-terminated polybutadiene — having dispersed therein from 50 to 80% (preferably 65–75%) by weight of a siliceous filler reinforcing material, at least 50% of which is in the form of fibers. The filler comprises 50–80% by weight asbestos fibers and 20–50% by weight asbestos floats.

Preliminary mixing of the binder, fibers and floats is accomplished in a mixer. The binder-wetted mass is first calendered on a differential speed mill and then on an even speed mill to yield the uncured sheet material. For more details of this aspect of the process, reference is again made to U.S. Pat. No. 3,872,205, which is incorporated herein by reference.

The sheet material is processed into strips, discs or shreds which may be used immediately, or stored at low temperature (about −10° C) to preserve their molding characteristics, by preventing or, at least, inhibiting curing of the polymer. Of course, the sheet material itself may be stored at low temperatures, and the strips, discs or shreds then prepared just prior to molding. The critical factor is that the molding material be in uncured state.

A typical formulation of the molding material is as follows:

| | | |
|---|---|---|
| a carboxyl-terminated polybutadiene polymer (e.g. HC-434 by Thiokol), | approx. | 28.2% |
| An epoxide cure agent (e.g. ERLA 0510 by Union Carbide), | | 1.5 |
| a catalyst such as iron octasol | | 0.3 |
| Reinforcing asbestos fibres (e.g. Grade 3Z12 asbestos by Johns-Manville) | | 52.5 |
| Asbestos filler (e.g. asbestos floats Grade 7TF1 by Johns-Manville). | | 17.5 |

The female and male portions of a steel mold suitable for forming the novel head-end insulator according to the embodiment of FIGS. 1 and 2 are illustrated in FIGS. 3a and 3b, respectively. The female portion 20 has a mold cavity 21 and the male portion 22 has a first cylindrical portion 23 which fits snugly into the cavity 21 and a second cylindrical portion 24 which is of slightly reduced diameter. Thus, the gap between the surface of the portion 24 and the inner wall of the cavity 21 forms the molding chamber for the wall 14b of the head-end insulator 14. The bottom of the cavity 21 has an upwardly extending projection (not seen in the drawings) which cooperates with a depression 25 in the top of the male mold portion 22 to form a molding chamber for the base of the cup-shaped insulator 14 and the projection 14a. All of the molding chamber surfaces are coated with polytetrafluoroethylene.

The shape of the molds for forming the embodiment of FIG. 1a, wherein a conical depression 14d is formed in place of the projection 14a, will be apparent from a consideration of FIG. 3c. Thus, the upwardly extending projection at the bottom of cavity 21 is dispensed with and the depression 25 has, centrally located thereof, a conical projection 26, which forms the depression 14d of the head-end insulator.

The molding material is weighed and charged into the cavity 21 of the female mold portion 20. The mold is closed and the material compressed therein for 2 to 4 minutes at approximately 15 tons pressure to form the head-end insulator 14, although the molding time and pressure are largely dependent upon the dimensions and shape of the article to be molded. Since the mold surfaces are coated with polytetrafluoroethylene, no other mold lubricant is required and it must be appreciated that the object of the molding operation is simply to compress the material to its desired shape — the molded part is uncured when it leaves the mold. Furthermore, the part is cohesive and may be handled with only moderate care without deformation or damage and the article requires no finishing prior to its implementation.

Upon testing, the uncured molded head-end insulator formed above is found to be flexible and easily insertable to a rocket motor propellant chamber — even when such chamber is slightly oval. Furthermore, the part fits closely the contour of the bulkhead when pressurized and will adhere to metal surfaces with or without the use of an adhesive when used within its normal shelf-life. Once cured in situ, the head-end insulator is found to have very good ablative and thermal insulation properties and has good flexibility at low temperatures.

After placement of the head-end insulator and associated components in the casing 10 to form the arrangement of FIG. 1 or FIG. 1a, the propellant can be charged to the chamber 12. In the embodiment of FIG. 1, a mandrel 17 is firstly inserted centrally of the chamber. The mandrel has a depression 17a which is complementary with the projection 14a of the head-end insulator, and the mandrel is thus located upon the head insulator. The propellant is then cast by gravity around the mandrel. In the embodiment of FIG. 1a, the charge is firstly loaded into the chamber and a mandrel 18 is then inserted into the chamber and forced through the charge and into the depression 14d. It may be seen that the mandrel 18 has a conically formed tip 18a, which is complementary with the depression 14d, and which therefore seats snugly within the depression to form a thin film of charge material between the tip and depression walls.

We claim:

1. A method of manufacturing a flexible, uncured molded article, said method comprising the steps of:
   (a) forming a sheet material comprising about 20 to 50% by weight of a substantially uncured elastomeric polymeric binder having dispersed therethrough a siliceous filler reinforcing material in an amount of from about 80% to about 50% by weight, at least about half of said reinforcing material being in fibrous form and the balance in the form of floats;
   (b) process said sheet material into strips, discs or shreds;
   (c) maintaining said strips, discs or shreds at sufficiently low temperature to at least inhibit curing thereof; and
   (d) cold-molding said strips, discs or shreds in a substantially uncured condition to form said uncured molded article.

2. The method of claim 1, wherein said elastomeric polymeric binder is a carboxyl-terminated polybutadiene.

3. The method of claim 1, wherein said binder has said siliceous filler reinforcing material dispersed therethrough in an amount of from about 65% to 75% by weight of the total composition.

4. The method of claim 1, wherein said article is a head-end insulator for a rocket motor propellant chamber, and is cold-molded at a pressure of about 15 tons for a period of from about 2 to about 4 minutes.

5. The method of claim 1, wherein said reinforcing material is asbestos.

6. The method of claim 1, wherein a mold is employed for said cold-molding step, said mold having at least the material-contacting surfaces thereof coated with polytetrafluoroethylene.

7. A method of manufacturing an uncured, flexible head-end insulator for use in the propellant chamber of a rocket motor, said method comprising the steps of:
   (a) forming a sheet material comprising about 20 to 50% by weight of a substantially uncured carboxyl-terminated polybutadiene binder having dispersed therethrough an asbestos reinforcing material in an amount of from about 80% to about 50% by weight, at least about half of said reinforcing material being in fibrous form and the balance in the form of floats;
   (b) processing said sheet material into strips, discs or shreds;
   (c) maintaining said strips, discs or shreds at sufficiently low temperature to at least inhibit curing thereof; and
   (d) cold-molding said strips, discs or shreds in a substantially uncured condition to form said uncured head-end insulator.

8. The method of claim 7, wherein said binder has said asbestos material dispersed therethrough in an amount of from about 65% to about 75% by weight of the total composition.

9. The method of claim 7, wherein said cold-molding step is performed at a pressure of about 15 tons for a period of from about 2 to about 4 minutes.

10. The method of claim 7, wherein a mold is employed for said cold-molding step, said mold having at least the material-contacting surfaces thereof coated with polytetrafluoroethylene.

11. A method of manufacturing a flexible, uncured, rocket motor propellant head-end insulator adherable to metal surfaces, said method comprising the successive steps of:
   (1) mixing together from about 25% to about 35% by weight of a substantially uncured carboxyl-terminated polybutadiene binder with from about 75% to about 65% by weight of an asbestos filler reinforcing material, the total of said binder and filler amounting to 100%,
      at least about half of said reinforcing material being in fibrous form, the balance thereof in the form of floats;
   (2) continuing said mixing and thoroughly dispersing said reinforcing material through said binder to form a mixture;
   (3) forming the mixture of step (2) into a sheet material;
   (4) shredding said sheet material of step (3) into strips, discs or shreds; and
   (5) cold-molding said strips, discs or shreds in a substantially uncured condition and under pressure to form said head-end insulator,
      wherein each of steps (1)–(5), inclusive, is conducted at a temperature such that curing of said binder is prevented or inhibited,
thereby producing a flexible, cold-molded heat-end insulator in the uncured state.

12. A method of manufacturing a flexible, uncured, rocket motor propellant head-end insulator comprising the successive steps of:
   (1) mixing together from about 20% to about 50% by weight of a substantially uncured carboxyl-terminated polybutadiene binder with from about 80% to about 50% by weight of a siliceous filler reinforcing material,
      at least about half of said reinforcing material being in fibrous form, the balance thereof in the form of floats;
   (2) continuing said mixing and thoroughly dispersing said reinforcing material through said binder to form a mixture;
   (3) forming the mixture of step (2) into a sheet material;

(4) shredding said sheet material of step (3) into strips, discs or shreds; and (5) cold-molding said strips, discs or shreds in a substantially uncured condition and under pressure to form said head-end insulator, wherein each of steps (1)–(5), inclusive, is conducted at a temperature such that curing of said binder is prevented or inhibited, thereby producing a flexible, cold-molded head-end insulator in the uncured state, which head-end insulator has the ability to adhere to metal surfaces.

13. The method of claim 12, wherein said siliceous filler reinforcing material is asbestos containing fibers and floats therein.

14. The method of claim 12, wherein said reinforcing material is present in an amount of from about 65% to about 75% by weight and said binder is present in an amount of from about 35% to about 25% by weight, the total weight % of said material amounting to 100%.

15. The method of claim 12, wherein said cold-molding step (5) is conducted at a pressure of about 15 tons for a period of from about 2 to about 4 minutes.

* * * * *